(12) United States Patent
Hall, Jr.

(10) Patent No.: US 7,538,951 B2
(45) Date of Patent: May 26, 2009

(54) ROBUST FAMILY OF MICRODISPLAY PROJECTION LENSES

(75) Inventor: Estill Thone Hall, Jr., Indianapolis, IN (US)

(73) Assignee: Thomson Licensing, Boulogne Billancourt (FR)

(*) Notice: Subject to any disclaimer, the term of this patent is extended or adjusted under 35 U.S.C. 154(b) by 0 days.

(21) Appl. No.: 10/588,022

(22) PCT Filed: Feb. 19, 2004

(86) PCT No.: PCT/US2004/004801

§ 371 (c)(1),
(2), (4) Date: Aug. 1, 2006

(87) PCT Pub. No.: WO2005/083488

PCT Pub. Date: Sep. 9, 2005

(65) Prior Publication Data

US 2007/0053067 A1    Mar. 8, 2007

(51) Int. Cl.
*G02B 3/00* (2006.01)
(52) U.S. Cl. .................. 359/649; 359/708; 359/754
(58) Field of Classification Search .......... 359/649, 359/650, 662, 708, 754–783, 679
See application file for complete search history.

(56) References Cited

U.S. PATENT DOCUMENTS 3,005,379 A * 10/1961 Klemt ................. 359/778
4,924,244 A    5/1990 Kataoka et al.
4,989,961 A    2/1991 Yoshioka
5,212,597 A    5/1993 Yamada
5,311,227 A    5/1994 Takayasu et al.
5,367,405 A   11/1994 Sado
5,555,034 A    9/1996 Watanabe et al.
5,592,238 A    1/1997 Ogino et al.
5,760,965 A    6/1998 Kim
6,643,069 B2  11/2003 Dewald

OTHER PUBLICATIONS

Search Report Dated Dec. 7, 2004.

* cited by examiner

*Primary Examiner*—Darryl J Collins
(74) *Attorney, Agent, or Firm*—Robert D. Shedd; Harvey D. Fried; Patricia Verlangieri (57) ABSTRACT

The present invention provides a projection lens system comprising a double-gauss architecture with aspheric lens elements at the beginning and end of the lens system with a system stop therebetween and an acromatic lens element pair between each aspheric lens and the system stop. Also provided is a projection lens family comprising a plurality of lens systems, each having a double-gauss base architecture with aspheric lens elements at the beginning and end of the lens system with a system stop therebetween and an acromatic lens element pair between each aspheric lens and the system stop. Each lens system is optimized to provide a different cost/performance option.

12 Claims, 10 Drawing Sheets

FIELD CURVATURE / DISTORTION

SPATIAL FREQUENCY IN CYCLES PER MILLIMETER

FIG. 17  FIELD CURVATURE / DISTORTION

9 ELEMENT WITHOUT RESTRICTIONS

ROBUST FAMILY OF MICRODISPLAY PROJECTION LENSES

FIELD OF THE INVENTION

This application claims the benefit, under 35 U.S.C. § 365 of International Application PCT/US2004/004801, filed 19, Feb. 2004, which was published in accordance with PCT Article 21(2) on 9, Sep. 2005 in English.

The invention relates to projection lenses and more particularly to a family of lenses with good performance over a wide variety of optimization parameters.

BACKGROUND OF THE INVENTION

In a microdisplay system, a modulated light output from an imager is projected by a projection lens system onto a screen to form a viewable image. Projection lens systems for existing microdisplay systems typically comprise eleven to thirteen lens elements. To produce a viewable image, the projection lens system must provide a relatively high performance. The number and quality of lens elements necessary to meet the performance requirements can result in high costs for the lens system. Also, existing projection lens systems are typically custom designed for a specific application, causing high design costs and limiting flexibility in the lens system.

SUMMARY OF THE INVENTION

The present invention provides a projection lens system comprising a double-gauss architecture with aspheric lens elements at the beginning and end of the lens system with a system stop therebetween and an acromatic lens element pair between each aspheric lens and the system stop.

Also provided is a projection lens family comprising a plurality of lens systems, each having a double-gauss base architecture with aspheric lens elements at the beginning and end of the lens system with a system stop therebetween and an acromatic lens element pair between each aspheric lens and the system stop. Each lens system is optimized to provide a different cost/performance option.

BRIEF DESCRIPTION OF THE DRAWINGS

The invention will be described with reference to the drawings, in which.

DETAILED DESCRIPTION OF THE INVENTION

The present invention provides a projection lens system with good performance using from 6 to 9 lens elements and a family of lens systems that provide an opportunity to perform a performance/cost tradeoff for a particular application to achieve the required performance at the least cost for that application without requiring a customized design. A family of projection lens systems, as shown in FIGS. 1, 3, 6, 9, 12, 15, and 18, is provided according to an exemplary embodiment of the present invention. Calculated performance data for the lens systems within the exemplary family is shown in FIGS. 2, 4, 5, 7, 8, 10, 11, 13, 14, 16, 17, 19, and 20. The exemplary family of lens systems provide a robust base architecture with various performance enhancing variations that allow for cost/performance tradeoffs to meet the requirements of a particular application, without the need for a custom design. The lens systems in the exemplary family receive an output matrix of modulated pixels of light from an imager (not shown) and project it onto a screen (not shown) to provide a viewable image. The lens system family provides a plurality of high-performance projection lens systems with from 6 to 9 lens elements, reducing cost as compared to a lens system with from 11 to 13 lens elements.

Figure 1:
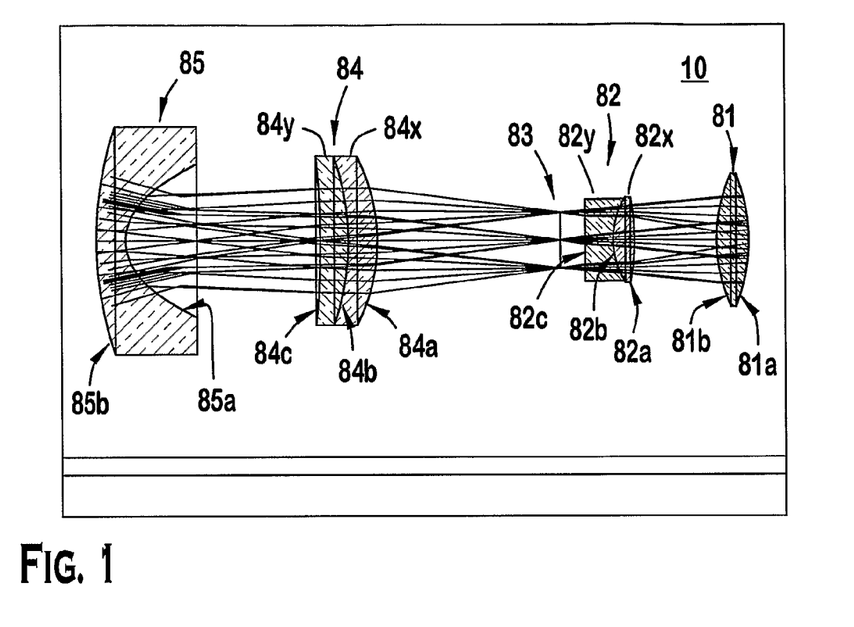
FIG. 1 shows an exemplary projection lens system comprising a base architecture for a family of lens systems according to an embodiment of the present invention.

Each lens system in the illustrated lens system family has a base architecture 10 as shown in FIG. 1. The base architecture 10 comprises 6 lens elements. Two acrylic aspheric lenses (i.e., aspheres) 81, 85 (the frontmost and rearmost lenses respectively) are disposed at opposite ends of the lens system 10 each forming a single aspheric lens element. Two glass acromatic lenses (i.e., acromats) 82, 84 (made from inexpensive glass types) are disposed between the aspheres 81, 85 with a stop 83 disposed between the acromats 82, 84. Each acromat 82, 84 comprises two spherical lens elements (i.e., lens elements with a uniform spherical geometry). Both surfaces of the second aspheric lens 85 have a forward direction of curvature (i.e., a positive radius). In the first aspheric lens 81, the first surface 81a has a backward direction of curvature (i.e., a negative radius) and the second surface 81b has a forward direction of curvature. The first acromatic lens 82 has three surfaces 82a, 82b, 82c defining two lens elements 82x, 82y. The first surface 82a has a negative direction of curvature and the second and third surfaces 82b, 82c have a positive direction of curvature. The second acromatic lens 84 also has three surfaces 83a, 83b, 83c defining two lens elements 84x, 84y. Each of the surfaces 84a, 84b, 84c of the second acromatic lens 84 have a negative direction of curvature. The acromat lens elements are made from inexpensive glass, such as SF14, SF15, BAK1, and BALF4.

Surface data for the lenses 81, 82, 84, 85 of an exemplary base architecture are provided in table 1, with the asymmetric coefficients provided in table 2. These exemplary lens surfaces were developed by the inventors using ZEMAX™ software and novel characteristics determined by the inventors. The thickness values are the distance to the previous surface (i.e., the thickness for the back surface of a lens element is the thickness of that lens element, and the thickness for the front surface of a lens is the air gap in front of that lens).

The projection lens system is disposed between an imager (not shown) and a viewing screen (not shown). The imager provides a matrix of light pixels of intensity modulated according to a signal provided to the imager. In a microdisplay using an LCOS imager, the output from the imager passes through a polarizing beam splitter or PBS (not shown) and into the first asphere 81 comprising a single aspheric lens element, which directs the modulated matrix of light into the first acromat 82. The first acromat 82 comprises two spherical lens elements 82x, 82y joined, for example, by an adhesive. The first acromat 82 focuses the matrix of light such that it converges and inverts at the lens system stop 83. After passing the system stop 83, the matrix of light diverges until it enters the second acromat 84. The second acromat 84 causes the matrix of light to converge and directs the matrix of light into the second asphere 85. The second asphere 85 projects the matrix of light onto the viewing screen in a diverging pattern to distribute the pixels of light over the viewing screen.

Figure 2:
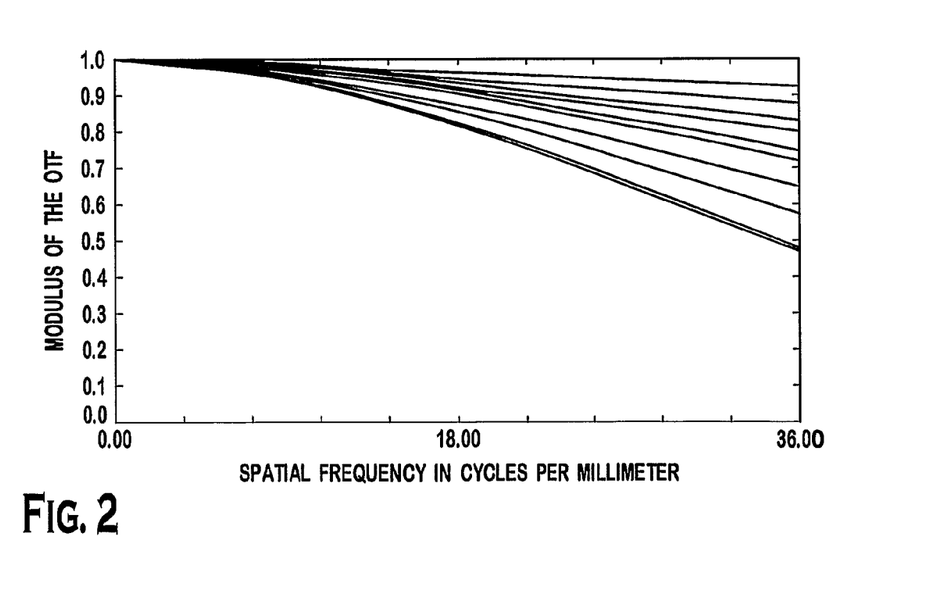
FIG. 2 shows a set of calculated curves for the optical transfer function for the exemplary projection lens system of FIG. 1.

FIG. 2 shows the calculated modulus of the optical transfer function (MTF) for the base architecture 10, described above. The values are calculated using ZEMAX™ software. At a spatial frequency of 36 cycles per millimeter, the MTF is greater than about 0.48 at the worst location, as shown in FIG. 2. The distortion, also called grid distortion, as determined for the base architecture 10 using ZEMAX™ software, is about 0.55%, meaning that at the worst location, the light from a specific pixel of an imager with a matrix 200 pixels wide will be projected onto the viewing screen at a location about a half of a pixel-width from the intended or optimum location.

TABLE 1

(dimensions in millimeters)

| Surface | Type | Radius | Thickness | Glass | Diameter | Conic |
|---|---|---|---|---|---|---|
| Object | Tiltsurf | — | 800 | | 1100.002 | — |
| 85b | Evenasph | 38.5088 | 5.001653 | Acrylic | 40.47387 | −5.355956 |
| 85a | Evenasph | 10.98371 | 34.25946 | | 27.51437 | −0.6193395 |
| 84c | Std | −167.0716 | 5.002426 | SF14 | 29.42735 | 0 |
| 84b | Std | −41.46908 | 5.000513 | BALF4 | 29.81779 | 0 |
| 84a | Std | −33.66583 | 32.2888 | | 30.03875 | 0 |
| 83 | Std | Infinity | 4.524869 | | 9.9 | 0 |
| 82c | Std | 6286.945 | 5.000679 | SF15 | 12.47376 | 0 |
| 82b | Std | 13.6423 | 3.930006 | BAK1 | 14.60009 | 0 |
| 82a | Std | −35.71084 | 14.37816 | | 15.10232 | 0 |
| 81b | Evenasph | 33.99418 | 5.519493 | Acrylic | 23.29553 | −1.845361 |
| 81a | Evenasph | −35.49287 | 5 | | 23.07195 | 1.13975 |
| PBS | Std | Infinity | 22 | SF2 | 28 | 0 |
| PBS | Std | Infinity | 3.811 | | 28 | 0 |
| IMA | Std | Infinity | | | 14.2852 | 0 |

TABLE 2

| Coefficient on: | Surface 85b: Evenasph | Surface 85a: Evenasph | Surface 81b: Evenasph | Surface 81a: Evenasph |
|---|---|---|---|---|
| $r^2$ | −0.00054791663 | 0.012988301 | 0.00079396543 | −0.0038806981 |
| $r^4$ | −3.0838499e−006 | 1.6236881e−005 | −9.4095275e−006 | −7.3020075e−006 |
| $r^6$ | −5.466657e−009 | −5.324113e−008 | 3.6388924e−008 | 4.0675206e−008 |
| $r^8$ | −4.1061329e−012 | −2.1673046e−010 | 2.9292307e−010 | 5.0587954e−010 |
| $r^{10}$ | −2.0256015e−015 | −1.0691285e−012 | 2.714626e−012 | 9.4224509e−013 |
| $r^{12}$ | 1.5717007e−017 | −7.1470969e−015 | 1.0054958e−014 | −8.6991601e−015 |
| $r^{14}$ | 2.0937221e−020 | −9.9506912e−018 | −6.1253376e−017 | 1.1004082e−016 |
| $r^{16}$ | −1.9681768e−023 | 1.2826798e−019 | 1.9231635e−018 | 2.2021662e−018 |

As indicated by the sum of the thickness values from table 1, the base architecture provides a system length of less than 1050 millimeters.

Figure 3:
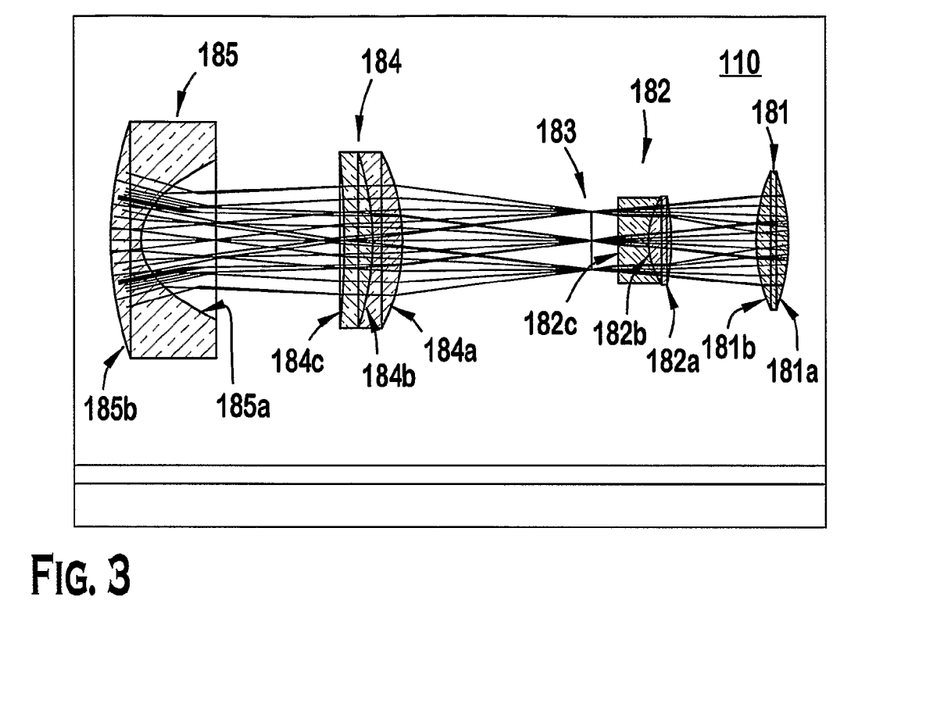
FIG. 3 shows an alternative exemplary projection lens system using long lenses according to an embodiment of the present invention.

FIG. 3 shows a first optimized lens system 110 in the exemplary family of lens systems. The first optimized lens system 110 is similar to the base architecture 10, described above, comprising, sequentially: a first asphere 181 with two surfaces 181a, 181b, a first acromat 182 with three surfaces 182a, 182b, 182c, a system stop 183, a second acromat 184 with three surfaces 184a, 184b, 184c, and a second asphere 185 with two surfaces 185a, 185b.

Surface data for the lenses 181, 182, 184, 185 of an exemplary first optimized lens system are provided in table 3, with the asymmetric coefficients provided in table 4. These exemplary lens surfaces were developed by the inventors using ZEMAX™ software and novel characteristics determined by the inventors. The thickness values are the distance to the previous surface (i.e., the thickness for the back surface of a lens element is the thickness of that lens element, and the thickness for the front surface of a lens is the air gap in front of that lens).

As indicated by the signs of the radii in table 3, the directions of curvature for the surfaces of the first optimized lens system 110 are the same as the corresponding surfaces for the base architecture. The first optimized lens system 110 differs from the base architecture 10 in that the lens elements of the first optimized lens system 110 have a greater thickness than the corresponding surfaces of the base architecture 10.

The first optimized lens system 110 differs from the base architecture 10, in that the thickness of the lens elements of the first optimized lens system 110 are not constrained for a short system, and are therefore greater than the thickness of the corresponding lens elements in the base architecture 10. The surface data for the first optimized lens system 110 is optimized for the new constraints (i.e., system length). While increasing the thickness of the lens elements enhances the performance of the first optimized lens system 110, cost is increased due to the material cost associated with the thicker lens elements. Also, since the overall length of the first optimized lens system 110 is greater than the length of the base architecture 10, as indicated by the sum of the thickness values in table 3, cost will be increased due to a larger tube required to accommodate the increased system length. Thus, the first optimized lens system 110 provides a performance/cost trade-off with respect to the base architecture, by providing enhanced performance for an increased cost.

TABLE 3

| Surface | Type | Radius | Thickness | Glass | Diameter | Conic |
|---|---|---|---|---|---|---|
| Object | Tiltsurf | — | 800 | | 1100.002 | — |
| 185b | Evenasph | 54.782.06 | 40.00075 | Acrylic | 85.74986 | 0.1130913 |
| 185a | Evenasph | 11.42802 | 20.84229 | | 30.85192 | −0.5945571 |
| 184c | Std | −71.65233 | 29.22574 | SF14 | 29.84802 | 0 |
| 184b | Std | −36.85354 | 29.23238 | Balf4 | 28.49685 | 0 |
| 184a | Std | −57.87299 | 24.82571 | | 23.68083 | 0 |
| 183 | Std | Infinity | 0.9972328 | | 9.9 | 0 |
| 182c | Std | 103.1884 | 13.63148 | SF15 | 10.74866 | 0 |
| 182b | Std | 15.17237 | 3.546629 | Bak1 | 15.13164 | 0 |
| 182a | Std | −58.00841 | 12.15952 | | 15.58684 | 0 |
| 181b | Evenasph | 28.28869 | 5.805668 | Acrylic | 23.36139 | −1.162881 |
| 181a | Evenasph | −42.64965 | 5 | | 23.25989 | 1.734617 |
| PBS | Std | Infinity | 22 | SF2 | 28 | 0 |
| PBS | Std | Infinity | 3.811 | | 28 | 0 |
| IMA | Std | Infinity | | | 14.2852 | 0 |

TABLE 4

| Coefficient on: | Surface 185b: Evenasph | Surface 185a: Evenasph | Surface 181b: Evenasph | Surface 181a: Evenasph |
|---|---|---|---|---|
| $r^2$ | 0.0020389207 | 0.0062811063 | 0.0018799078 | −0.0042941479 |
| $r^4$ | 2.6003985e−007 | 2.3788631e−005 | −9.888127e−006 | −5.7601154e−006 |
| $r^6$ | −1.9606803e−010 | 5.4924326e−009 | 3.0062322e−008 | 2.0584827e−008 |
| $r^8$ | −1.1920011e−014 | 4.9318997e−010 | 5.7871364e−011 | 3.9588222e−010 |
| $r^{10}$ | 1.116435e.017 | −7.198808e−013 | 1.3442822e−012 | 1.0669472e−013 |
| $r^{12}$ | 1.1069762e−021 | −6.9313273e−015 | 2.2052094e−015 | −4.1422007e−015 |
| $r^{14}$ | −3.1732857e−024 | 4.7437457e−017 | −5.7310433e−017 | −6.3755255e−017 |
| $r^{16}$ | −2.2129836e−027 | −2.3397811e−020 | 1.138824e−018 | 1.5422089e−018 |

Figure 4:
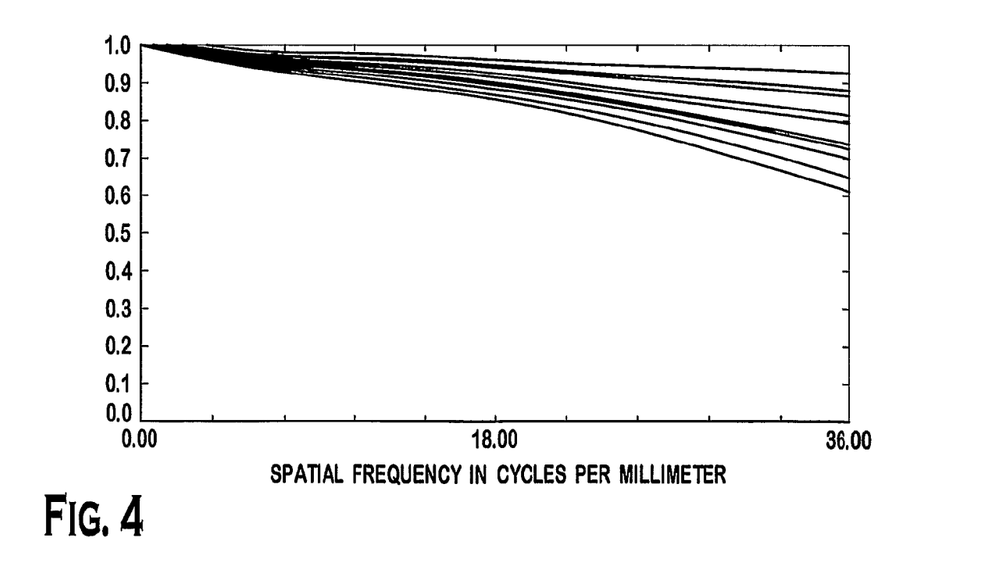
FIG. 4 shows a set of calculated curves for the optical transfer function for the exemplary projection lens system of FIG. 3.
Figure 5:
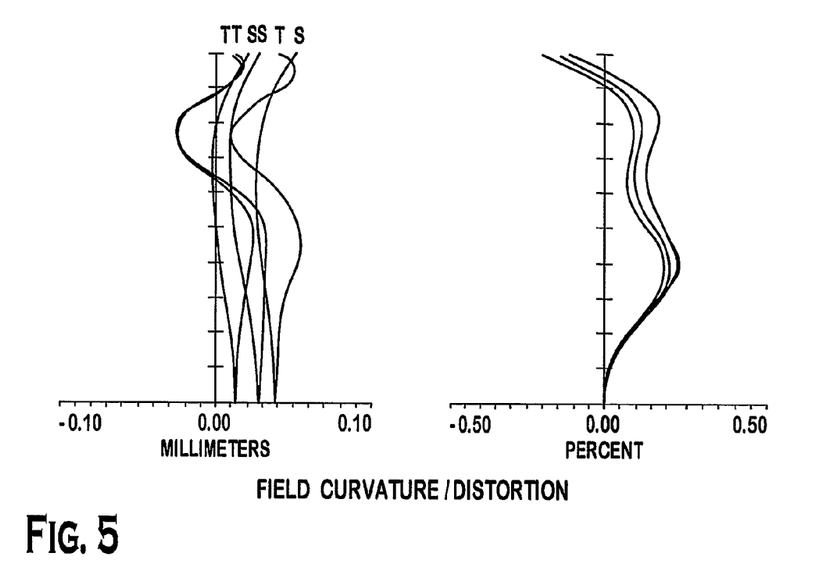
FIG. 5 shows a set of calculated curves for field curvature distortion for the exemplary projection lens system of FIG. 3.

FIGS. 4 and 5 show performance data for the first optimized lens system 110, as calculated using ZEMAX™ software. As shown in FIG. 4, the MTF for the first optimized lens system 110 is greater than 0.6 at 36 cycles per millimeter. As shown in FIG. 5, the distortion due to field curvature is less than 0.5% resulted in a grid distortion of less than about 0.21%.

Figure 6:
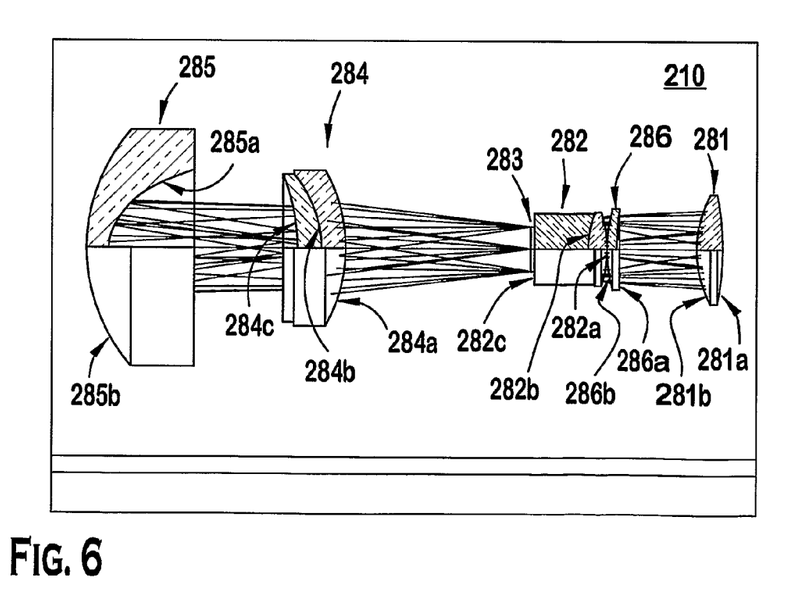
FIG. 6 shows an alternative exemplary projection lens system using the base architecture and an added asphere according to an embodiment of the present invention.

A second optimized lens system 210 is shown in FIG. 6. In the second optimized lens system 210, a first asphere 281, a first acromat 282, a system stop 283, a second acromat 284, and a second asphere 285 are sequentially disposed corresponding to lenses 81, 82, 84, 85 and system stop 83 of the base architecture 10. Additionally, a third asphere 286 is disposed between first asphere 281 and first acromat 282. The surface data for the second optimized lens system 210 is optimized for the new constraints (i.e., added asphere).

Surface data for the lenses 281, 282, 284, 285, 286 of an exemplary second optimized lens system are provided in table 5, with the asymmetric coefficients provided in table 6. These exemplary lens surfaces were developed by the inventors using ZEMAX™ software and novel characteristics determined by the inventors. The thickness values are the distance to the previous surface (i.e., the thickness for the back surface of a lens element is the thickness of that lens element, and the thickness for the front surface of a lens is the air gap in front of that lens). As indicated by the signs of the radii in table 5, the directions of curvature for the surfaces of the second optimized lens system 210 are the same as the corresponding surfaces for the base architecture.

Figure 7:
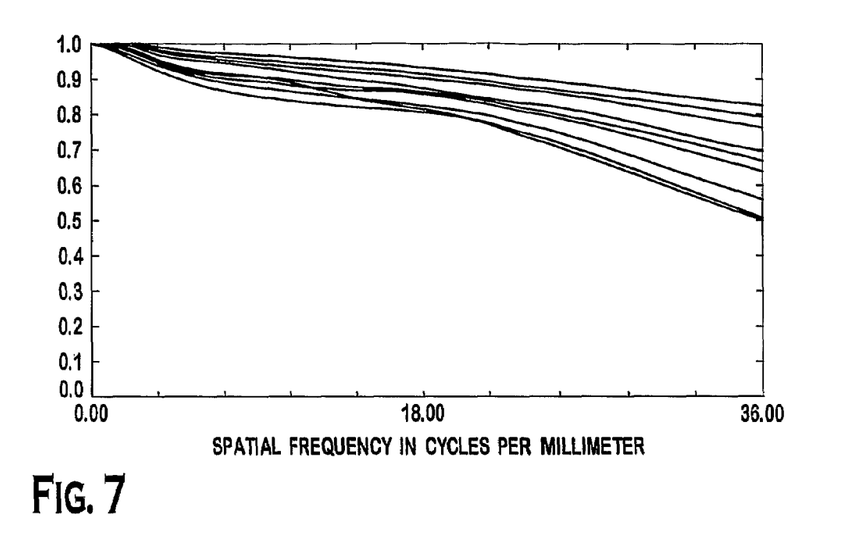
FIG. 7 shows a set of calculated curves for the optical transfer function for the exemplary projection lens system of FIG. 6.
Figure 8:
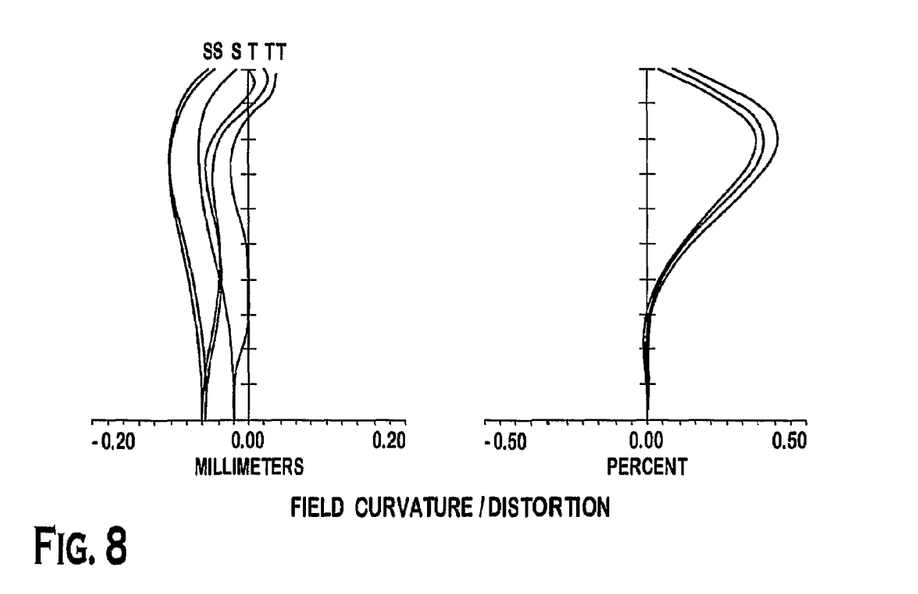
FIG. 8 shows a set of calculated curves for field curvature distortion for the exemplary projection lens system of FIG. 6.

While the added asphere 286 enhances the performance of the second optimized lens system 210, cost is increased due to the material and processing cost associated with the added lens. Thus, the second optimized lens system 210 provides a performance/cost trade-off with respect to the base architecture and first optimized lens system 110.

ware. As shown in FIG. 7, the MTF for the first optimized lens system 110 is greater than about 0.5 at 36 cycles per millimeter. As shown in FIG. 8, the distortion due to field curvature is less than 0.5% resulted in a grid distortion of less than about 0.37%.

Figure 9:
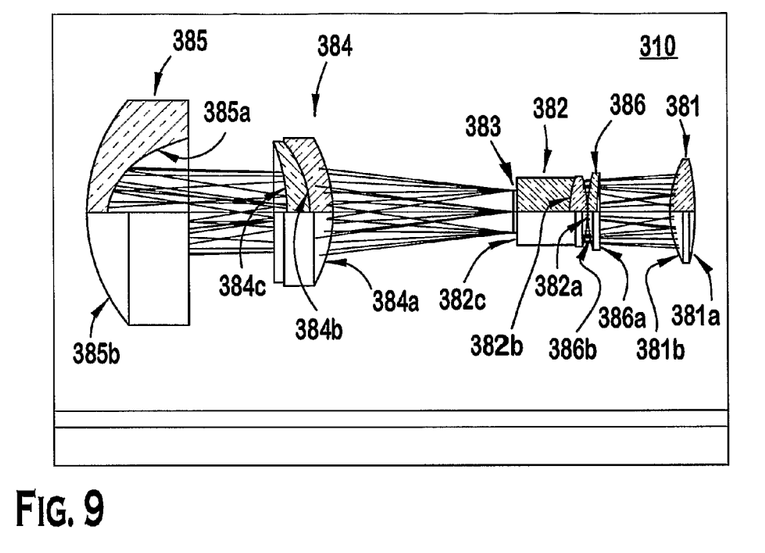
FIG. 9 shows an alternative exemplary projection lens system using long lenses and an added asphere according to an embodiment of the present invention.

A third optimized lens system 310 is shown in FIG. 9. In the third optimized lens system 310, a first asphere 381, a third asphere 386, a first acromat 382, a system stop 383, a second acromat 384, and a second asphere 385 are sequentially disposed corresponding to lenses 281, 286, 282, 284, 285 and system stop 283 of the second optimized lens system 210. The third optimized lens system 310 differs from the second optimized lens system 210, in that the thickness of the lens ele-

TABLE 5

| Surface | Type | Radius | Thickness | Glass | Diameter | Conic |
| --- | --- | --- | --- | --- | --- | --- |
| Object | Tiltsurf | — | 800 | | 1100.002 | — |
| 285b | Evenasph | 42.33706 | 5.009098 | Acrylic | 50.8006 | −0.2496601 |
| 285a | Evenasph | 11.73176 | 39.99988 | | 33.09326 | −0.5871293 |
| 284c | Std | −45.47577 | 5.009518 | SF14 | 31.55416 | 0.2966581 |
| 284b | Std | −21.79507 | 5.003933 | BALF4 | 32.17351 | −1.136171 |
| 284a | Std | −35.98523 | 40.00842 | | 33.16309 | 1.072578 |
| 283 | Std | Infinity | 0.6661559 | | 9.9 | 0 |
| 282c | Std | −78.48861 | 11.66798 | SF15 | 10.38941 | 0.3613896 |
| 282b | Std | 21.28694 | 3.422033 | Bak1 | 15.55666 | −0.8286225 |
| 282a | Std | −34.04379 | 0.4893632 | | 16.08972 | 2.828436 |
| 286b | Evenasph | 30.89964 | 2.028189 | Acrylic | 17.24871 | −12.41025 |
| 286a | Evenasph | 66.73687 | 15.89613 | | 17.51868 | −83.78206 |
| 281b | Evenasph | 27.9639 | 5.234023 | Acrylic | 23.35015 | −0.01637275 |
| 281a | Evenasph | −57.30318 | 5 | | 23.13918 | −13.82488 |
| 14 | Standard | Infinity | 22 | SF2 | 28 | 0 |
| 15 | Standard | Infinity | 3.811 | | 28 | 0 |
| IMA | Std | Infinity | | | 14.2852 | 0 |

TABLE 6

| Co-efficient on: | Surface 285b: Evenasph | Surface 285a: Evenasph | Surface 286b: Evenasph |
| --- | --- | --- | --- |
| $r^2$ | 0.0027100894 | 0.0019914503 | 0.00043090224 |
| $r^4$ | −5.1112521e−007 | 8.3007272e−006 | −2.8023224e−007 |
| $r^6$ | −2.5607057e−010 | 1.8279143e−009 | 4.1510071e−008 |
| $r^8$ | −1.0925963e−013 | 6.2142562e−011 | −1.1103848e−010 |
| $r^{10}$ | −6.2408044e−017 | −3.1627387e−014 | −6.8364266e−012 |
| $r^{12}$ | 7.004429e−021 | −2.9261793e−016 | −6.6230528e−014 |
| $r^{14}$ | 1.5783037e−022 | 6.22289888e−019 | −6.5560265e−016 |
| $r^{16}$ | 4.4943073e−025 | 7.142994e−021 | −2.1516978e−018 |

| Co-efficient on: | Surface 286a: Evenasph | Surface 281b: Evenasph | Surface 281a: Evenasph |
| --- | --- | --- | --- |
| $r^2$ | −0.00045906677 | 0.00037744287 | −0.0015616809 |
| $r^4$ | −1.3342011e−006 | 1.3960712e−007 | −1.0286283e−006 |
| $r^6$ | −4.2077288e−008 | 6.5386877e−009 | 3.784572e−009 |
| $r^8$ | 2.838692e−011 | 1.1070467e−011 | 4.7923626e−011 |
| $r^{10}$ | 4.1598305e−012 | 1.4603271e−013 | 2.4550356e−013 |
| $r^{12}$ | 6.9339179e−015 | 2.8832649e−015 | 2.113483e−016 |
| $r^{14}$ | −7.8305764e−016 | 2.3424706e−017 | 3.0507855e−018 |
| $r^{16}$ | −1.7844867e−017 | 1.3935341e−020 | 2.4791819e |

FIGS. 7 and 8 show performance data for the second optimized lens system 210, as calculated using ZEMAX™ softments of the third optimized lens system 310 are not constrained for a short system, and are therefore greater than the thickness of the corresponding lens elements in the second optimized lens system 210. The surface data for the third optimized lens system 310 is optimized for the new constraints (i.e., system length). While increasing the thickness of the lens elements enhances the performance of the third optimized lens system 310, cost is increased due to the material cost associated with the thicker lens elements. The surface data for the third optimized lens system 310 is optimized for the new constraints (i.e., thickness constraints).

Surface data for the lenses 381, 382, 384, 385, 386 of an exemplary third optimized lens system are provided in table 7, with the asymmetric coefficients provided in table 8. These exemplary lens surfaces were developed by the inventors using ZEMAX™ software and novel characteristics determined by the inventors. The thickness values are the distance to the previous surface (i.e., the thickness for the back surface of a lens element is the thickness of that lens element, and the thickness for the front surface of a lens is the air gap in front of that lens). As indicated by the signs of the radii in table 7, the directions of curvature for the surfaces of the third optimized lens system 310 are the same as the corresponding surfaces for the second optimized lens system 210.

TABLE 7

| Surface | Type | Radius | Thickness | Glass | Diameter | Conic |
|---|---|---|---|---|---|---|
| Object | Tiltsurf | — | 800 | | 1100.002 | — |
| 385b | Evenasph | 53.74491 | 40.0002 | Acrylic | 89.44526 | −0.09230615 |
| 385a | Evenasph | 11.69796 | 20.709.59 | | 33.24061 | −0.5627834 |
| 384c | Standard | −45.38095 | 30.45469 | SF14 | 32.09242 | 2.34988 |
| 384b | Standard | −30.03267 | 40.00116 | BALF4 | 34.82094 | −2.042391 |
| 384a | Standard | −41.05816 | 38.09771 | | 34.12486 | −0.8457163 |
| 383 | Standard | Infinity | 0.6779337 | | 9.9 | 0 |
| 382c | Standard | −76.10447 | 0.9981489 | SF15 | 10.36971 | 18.63513 |
| 382b | Standard | 19.71153 | 12.28832 | Bak1 | 11.06497 | −3.325162 |
| 382a | Standard | −35.71194 | 6.340118 | | 15.93804 | 1.121737 |
| 386b | Evenasph | 39.66016 | 1.662293 | Acrylic | 19.64652 | −11.01615 |
| 386a | Evenasph | 100.0334 | 11.05696 | | 19.74318 | −97.89724 |
| 381b | Evenasph | 25.85814 | 4.947632 | Acrylic | 23.83121 | −0.03805032 |
| 381a | Evenasph | −76.29306 | 5 | | 23.61417 | −4.170386 |
| PBS | Standard | Infinity | 22 | SF2 | 28 | 0 |
| PBS | Standard | Infinity | 3.811 | | 28 | 0 |
| IMA | Standard | Infinity | | | 14.2852 | 0 |

TABLE 8

| Co-efficient on: | Surface 385b: Evenasph | Surface 385a: Evenasph | Surface 386b: Evenasph |
|---|---|---|---|
| $r^2$ | 0.00013745476 | −4.5742211e−005 | −9.7142182e−006 |
| $r^4$ | −1.8947137e−007 | −4.5816404e−006 | −2.0375572e−007 |
| $r^6$ | 1.5316435e−011 | −1.3632584e−008 | 4.1362962e−009 |
| $r^8$ | 2.501478e−014 | −1.7748662e−011 | 3.5786839e−011 |
| $r^{10}$ | 1.4695096e−017 | 1.3783896e−014 | −9.597553e−013 |
| $r^{12}$ | 5.6077275e−021 | 3.0462773e−007 | −1.3442987e−014 |
| $r^{14}$ | 7.3400845e−025 | 4.4486303e−019 | 7.7620488e−017 |
| $r^{16}$ | −1.0674011e−027 | 1.9433666e−021 | 1.0104074e−017 |

| Co-efficient on: | Surface 386a: Evenasph | Surface 381b: Evenasph | Surface 381a: Evenasph |
|---|---|---|---|
| $r^2$ | −1.2478864e−005 | 0.00019301254 | −0.00070944959 |
| $r^4$ | 4.9548789e−007 | 5.0169408e−007 | −2.6371676e−006 |
| $r^6$ | −9.2066884e−009 | −8.5198025e−009 | 1.6488689e−008 |
| $r^8$ | −1.4196881e−010 | 4.8404039e−011 | 4.3322983e−011 |
| $r^{10}$ | 9.7281749e−013 | 6.6358371e−013 | −2.4425644e−014 |
| $r^{12}$ | 3.2768312e−014 | 3.3460999e−015 | 3.0418029e−016 |
| $r^{14}$ | 4.2596697e−016 | 5.2938933e−018 | 1.4238737e−017 |
| $r^{16}$ | 2.1440729e−018 | −1.883677e−020 | 1.3828764e−019 |

Figure 10:
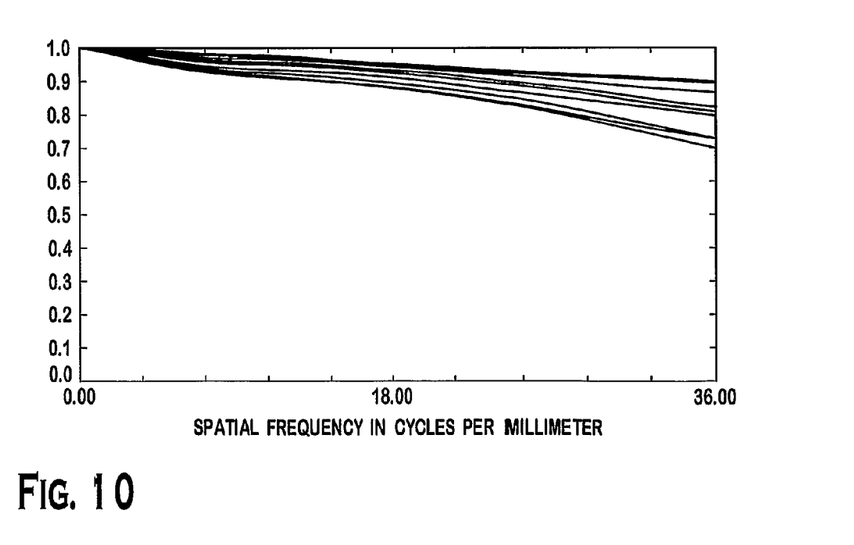
FIG. 10 shows a set of calculated curves for the optical transfer function for the exemplary projection lens system of FIG. 9.
Figure 11:
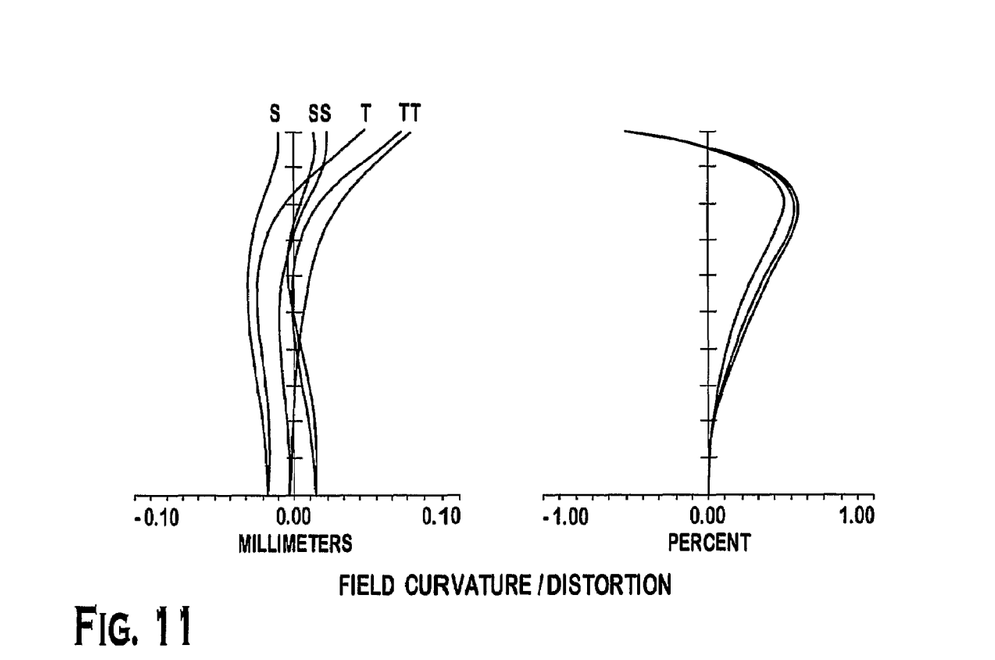
FIG. 11 shows a set of calculated curves for field curvature distortion for the exemplary projection lens system of FIG. 9.

FIGS. 10 and 11 show performance data for the third optimized lens system 310, as calculated using ZEMAX™ software. As shown in FIG. 10, the MTF for the third optimized lens system 310 is greater than about 0.7 at 36 cycles per millimeter. As shown in FIG. 11, the distortion due to field curvature is less than about 0.6% resulted in a grid distortion of less than about 0.53%.

Figure 12:
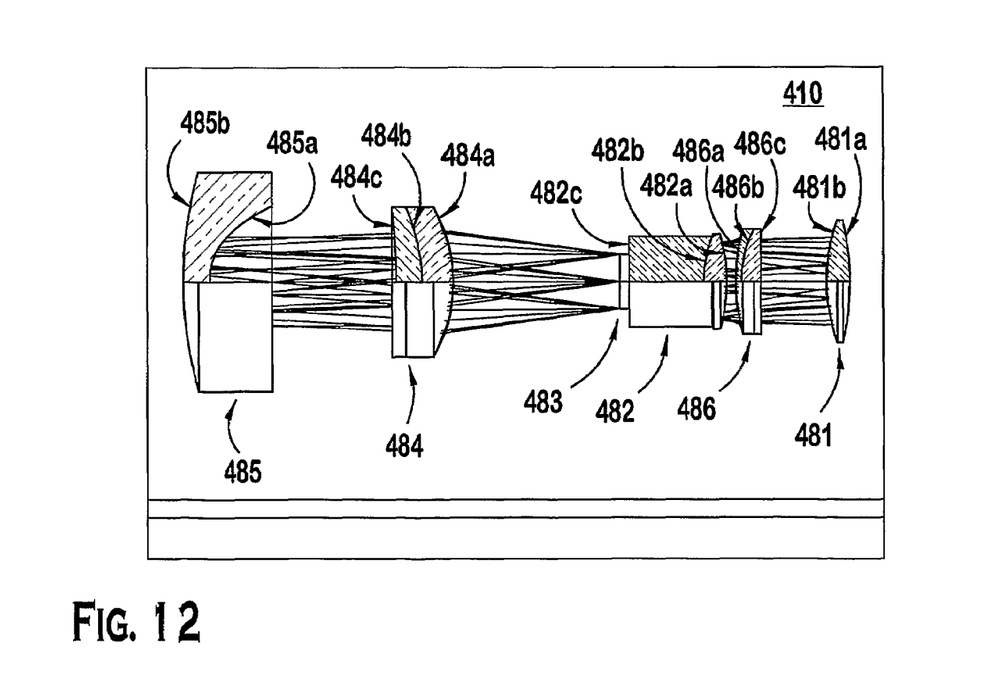
FIG. 12 shows an alternative exemplary projection lens system using the base architecture and an added acromat according to an embodiment of the present invention.

A fourth optimized lens system 410 is shown in FIG. 12. In the fourth optimized lens system 410, a first asphere 481, a first acromat 482, a system stop 483, a second acromat 484, and a second asphere 485 are sequentially disposed corresponding to lenses 81, 82, 84, 85 and system stop 83 of the base architecture 10. Additionally, a third acromat 486 is disposed between first asphere 481 and first acromat 482. The surface data for the fourth optimized lens system 410 is optimized for the new constraints (i.e., added acromat).

Surface data for the lenses 481, 482, 484, 485, 486 of an exemplary fourth optimized lens system are provided in table 9, with the asymmetric coefficients provided in table 10. These exemplary lens surfaces were developed by the inventors using ZEMAX™ software and novel characteristics determined by the inventors. The thickness values are the distance to the previous surface (i.e., the thickness for the back surface of a lens element is the thickness of that lens element, and the thickness for the front surface of a lens is the air gap in front of that lens). As indicated by the signs of the radii in table 9, the directions of curvature for the surfaces of the fourth optimized lens system 410 are the same as the corresponding surfaces for the base architecture.

While the added acromat 486 enhances the performance of the fourth optimized lens system 410, cost is increased due to the material and processing cost associated with the added lens. Thus, the fourth optimized lens system 410 provides a performance/cost trade-off with respect to the base architecture and other optimized lens systems.

TABLE 9

| Surface | Type | Radius | Thickness | Glass | Diameter | Conic |
|---|---|---|---|---|---|---|
| Object | Tiltsurf | — | 800 | | 1100.002 | — |
| 485b | Evenasph | 50.52135 | 5.003641 | Acrylic | 40.96973 | −4.86756 |
| 485a | Evenasph | 11.12721 | 34.20341 | | 28.15665 | −0.6342569 |
| 484c | Standard | −130.4465 | 5.001792 | SF14 | 27.79878 | 0 |
| 484b | Standard | −34.10937 | 5.003132 | Balf4 | 28.05397 | 0 |
| 484a | Standard | −36.92015 | 29.99528 | | 27.99226 | 0 |
| 483 | Standard | Infinity | 1.992378 | | 9.9 | 0 |
| 482c | Standard | −72.30641 | 13.21982 | SF15 | 11.04937 | 0 |
| 482b | Standard | 20.41885 | 3.87008 | Bak1 | 16.69782 | 0 |
| 482a | Standard | −34.7897 | 1.840644 | | 17.24212 | 0 |
| 486c | Standard | 37.24344 | 0.9965786 | Balf4 | 19.1847 | 0 |
| 486b | Standard | 21.15049 | 2.993515 | Sk5 | 19.36948 | 0 |
| 486a | Standard | 133.8268 | 12.025 | | 19.45986 | 0 |
| 481b | Evenasph | 37.33862 | 4.130968 | Acrylic | 22.52699 | −2.084634 |

TABLE 9-continued

| Surface | Type | Radius | Thickness | Glass | Diameter | Conic |
|---|---|---|---|---|---|---|
| 481a | Evenasph | −46.17849 | 5 | | 22.31879 | 1.494469 |
| PBS | Standard | Infinity | 22 | SF2 | 28 | 0 |
| PBS | Standard | Infinity | 3.811 | | 28 | 0 |
| IMA | Standard | Infinity | | | 14.2852 | 0 |

TABLE 10

| Coefficient on: | Surface 485b: Evenasph | Surface 485a: Evenasph | Surface 481b: Evenasph | Surface 481a: Evenasph |
|---|---|---|---|---|
| $r^2$ | −0.0006802717 | 0.0063602141 | −0.00035947982 | −0.0015029175 |
| $r^4$ | −2.2821441e−006 | 8.9985456e−006 | −8.6992168e−006 | −5.9041406e−006 |
| $r^6$ | −2.7493838e−009 | −3.4769735e−008 | 1.9828167e−008 | 4.5020148e−008 |
| $r^8$ | −1.6711363e−012 | −1.2967929e−010 | 4.1732414e−010 | 3.8122183e−010 |
| $r^{10}$ | 1.295024e−015 | −4.9536866e−013 | 3.0507042e−012 | 1.9946915e−012 |
| $r1^2$ | 6.1830123e−018 | −1.2709455e−015 | 1.2132215e−014 | 1.4047941e−014 |
| $r^{14}$ | 5.1712412e−021 | −2.7673541e−018 | 1.0531052e−017 | 1.3054332e−016 |
| $r^{16}$ | −3.9274165e−023 | −1.6373353e−020 | 8.5057059e−019 | 3.5823289e−019 |

Figure 13:
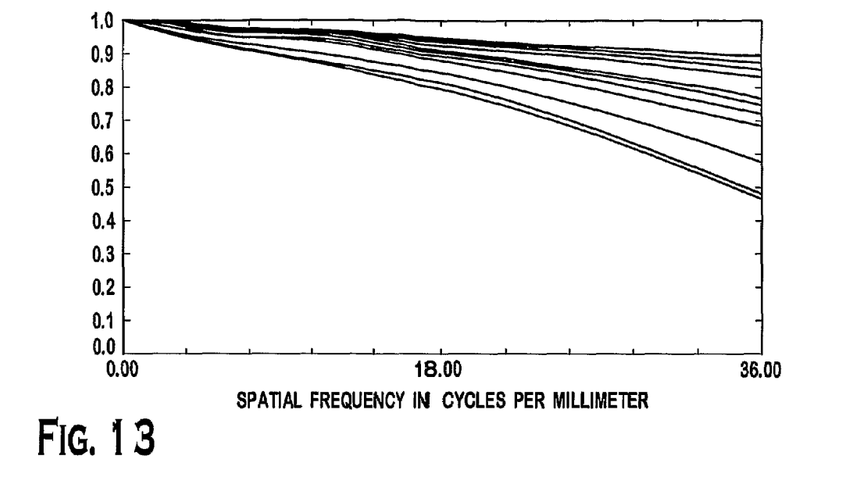
FIG. 13 shows a set of calculated curves for the optical transfer function for the exemplary projection lens system of FIG. 12.
Figure 14:
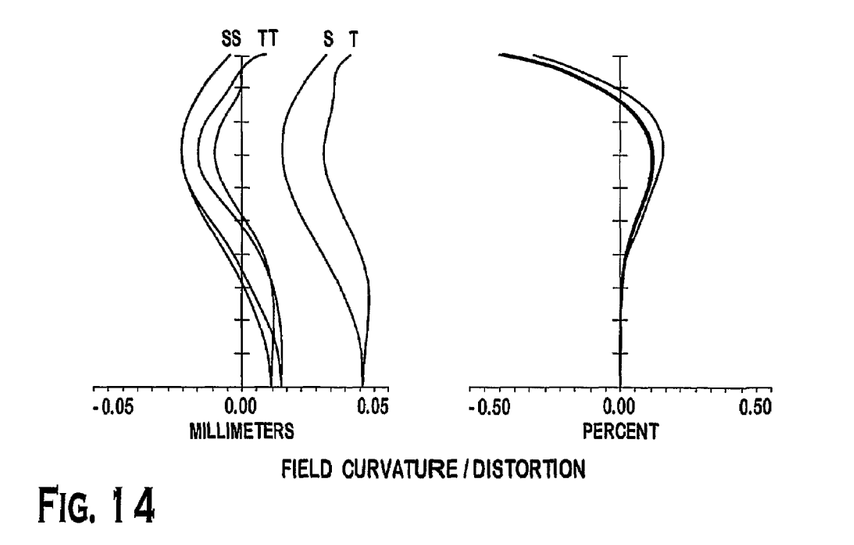
FIG. 14 shows a set of calculated curves for field curvature distortion for the exemplary projection lens system of FIG. 12.

FIGS. 13 and 14 show performance data for the fourth optimized lens system 410, as calculated using ZEMAX™ software. As shown in FIG. 13, the MTF for the fourth optimized lens system 410 is greater than about 0.45 at 36 cycles per millimeter. As shown in FIG. 14, the distortion due to field curvature is less than about 0.3% resulted in a grid distortion of less than about 0.11%.

Figure 15:
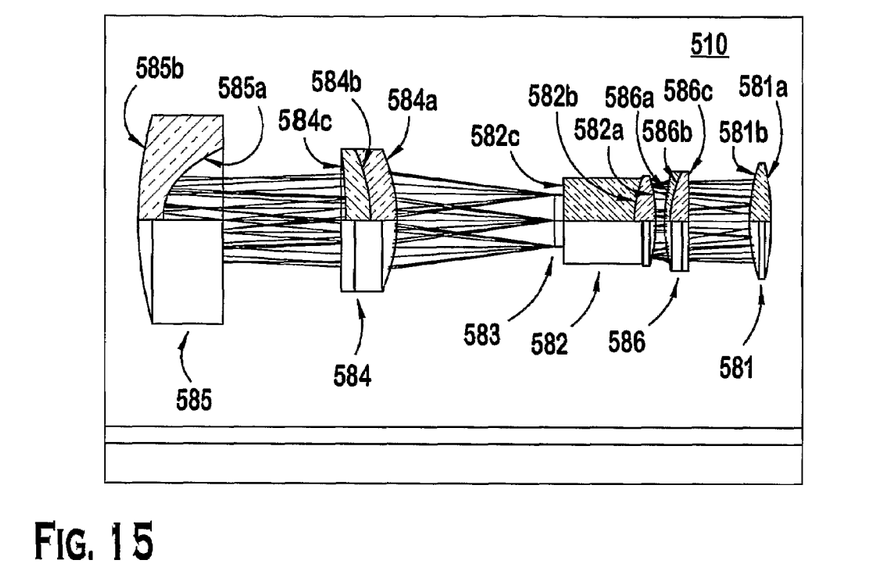
FIG. 15 shows an alternative exemplary projection lens system using long lenses and an added acromat according to an embodiment of the present invention.

A fifth optimized lens system 510 is shown in FIG. 15. In the fifth optimized lens system 510, a first asphere 581, a third acromat 586, a first acromat 582, a system stop 583, a second acromat 584, and a second asphere 585 are sequentially disposed corresponding to lenses 481, 486, 482, 484, 485 and system stop 483 of the fourth optimized lens system 410. The fifth optimized lens system 510 differs from the fourth optimized lens system 410, in that the thickness of the lens elements of the fifth optimized lens system 510 are not constrained for a short system, and are therefore greater than the thickness of the corresponding lens elements in the fourth optimized lens system 410. The surface data for the fifth optimized lens system 510 is optimized for the new constraints.

Surface data for the lenses 581, 582, 584, 585, 586 of an exemplary fifth optimized lens system are provided in table 11, with the asymmetric coefficients provided in table 12. These exemplary lens surfaces were developed by the inventors using ZEMAX™ software and novel characteristics determined by the inventors. The thickness values are the distance to the previous surface (i.e., the thickness for the back surface of a lens element is the thickness of that lens element, and the thickness for the front surface of a lens is the air gap in front of that lens). As indicated by the signs of the radii in table 11, the directions of curvature for the surfaces of the fifth optimized lens system 510 are the same as the corresponding surfaces for the base architecture.

While the added acromat 586 and longer lenses enhance the performance of the fifth optimized lens system 510, cost is increased due to the material and processing cost associated with the added and lengthened lens. Thus, the fifth optimized lens system 510 provides a performance/cost trade-off with respect to the base architecture and other optimized lens systems.

TABLE 11

| Surface | Type | Radius | Thickness | Glass | Diameter | Conic |
|---|---|---|---|---|---|---|
| Object | Tiltsurf | — | 800 | | 1100.002 | — |
| 585b | Evenasph | 52.46843 | 36.57252 | Acrylic | 83.0954 | −0.07632012 |
| 585a | Evenasph | 11.48722 | 19.69203 | | 31.91051 | −0.5605351 |
| 584c | Standard | −44.18267 | 28.66346 | SF14 | 29.69464 | 3.131137 |
| 584b | Standard | −23.99357 | 38.91836 | Balf4 | 30.97805 | −1.411727 |
| 584a | Standard | −41.35651 | 26.94158 | | 27.01915 | −1.100738 |
| 583 | Standard | Infinity | 0.7921657 | | 9.9 | 0 |
| 582c | Standard | −71.63282 | 0.9983615 | SF15 | 10.41914 | 26.86226 |
| 582b | Standard | 17.34479 | 13.27932 | Bak1 | 11.15969 | −3.885082 |
| 582a | Standard | −35.74189 | 5.444396 | | 16.50451 | 2.348688 |
| 586c | Standard | 37.74798 | 1.744352 | Balf4 | 19.80114 | −10.18096 |
| 586b | Standard | 50.87134 | 0.9907064 | SK5 | 19.91557 | −377.24 |
| 586a | Standard | 88.68739 | 11.36788 | | 20.02958 | −107.9219 |
| 581b | Evenasph | 24.81805 | 4.714736 | Acrylic | 23.7275 | −0.07298942 |
| 581a | Evenasph | −99.91444 | 5 | | 23.57781 | −25.18281 |
| PBS | Standard | Infinity | 22 | SF2 | 28 | 0 |
| PBS | Standard | Infinity | 3.811 | | 28 | 0 |
| IMA | Standard | Infinity | | | 14.2852 | 0 |

TABLE 12

| Coefficient on: | Surface 585b: Evenasph | Surface 585a: Evenasph | Surface 581b: Evenasph | Surface 581a: Evenasph |
|---|---|---|---|---|
| $r^2$ | 0.00019757201 | −0.00013318065 | 0.00017331201 | −0.00033683048 |
| $r^4$ | −2.854617e−007 | −5.41484e−006 | −2.9489628e−007 | −4.0915462e−007 |
| $r^6$ | 3.7241704e−012 | −3.0833359e−008 | 4.8781627e−009 | 1.5949421e−008 |
| $r^8$ | 2.1486926e−014 | −4.1643355e−001 | 1.0063569e−010 | 2.7558306e−011 |
| $r^{10}$ | 1.366143e−017 | −3.2145382e−014 | 4.0524009e−013 | −1.9916595e−013 |
| $r1^2$ | 7.0829051e−021 | −5.7362975e−017 | −2.7724227e−015 | −1.6865348e−015 |
| $r^{14}$ | 3.595454e−024 | −3.1434602e−019 | −5.0138802e−017 | −2.3480087e−017 |
| $r^{16}$ | 1.4309008e−027 | −1.9434248e−021 | −3.7121969e−019 | −4.9279117e−019 |

Figure 16:
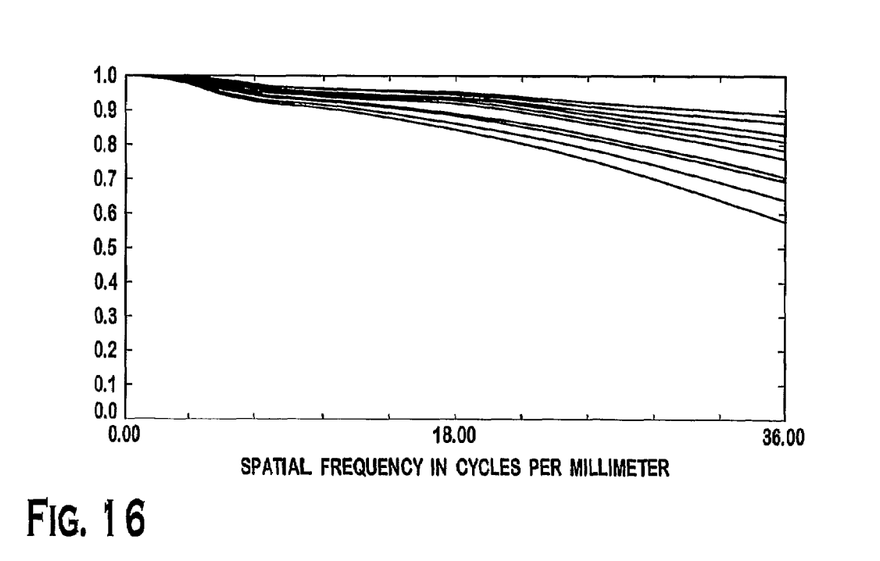
FIG. 16 shows a set of calculated curves for the optical transfer function for the exemplary projection lens system of FIG. 15.
Figure 17:
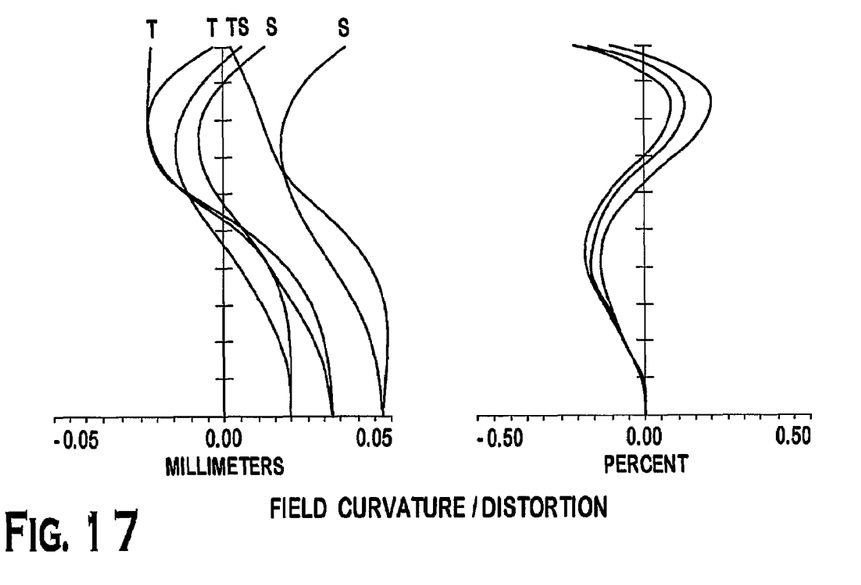
FIG. 17 shows a set of calculated curves for field curvature distortion for the exemplary projection lens system of FIG. 15.

FIGS. 16 and 17 show performance data for the fifth optimized lens system 510, as calculated using ZEMAX™ software. As shown in FIG. 16, the MTF for the fifth optimized lens system 510 is greater than about 0.55 at 36 cycles per millimeter. As shown in FIG. 17, the distortion due to field curvature is less than about 0.4% resulted in a grid distortion of less than about 0.16%.

Figure 18:
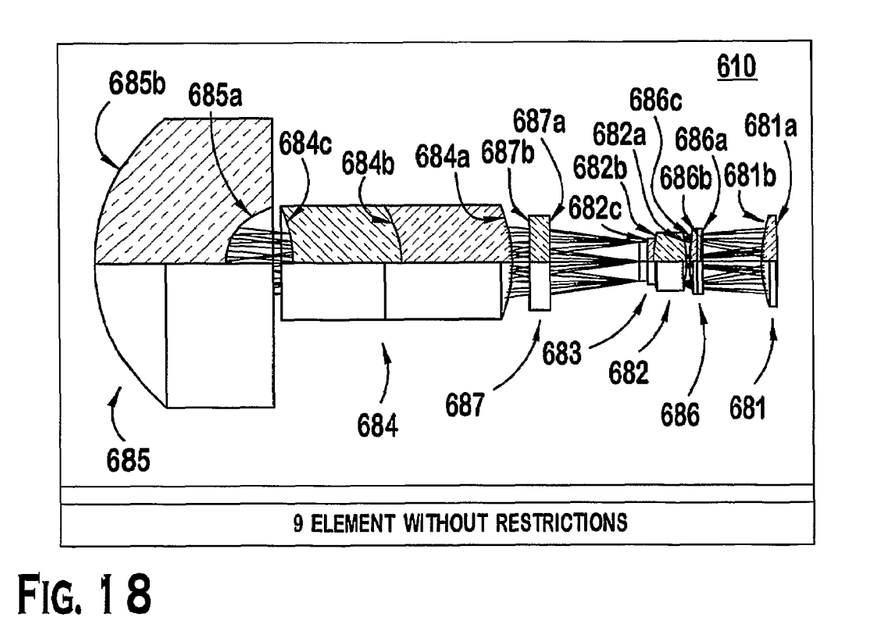
FIG. 18 shows an alternative exemplary projection lens system using an added asphere and an added acromat and with aspheric surfaces on the acromats according to an embodiment of the present invention.

A sixth optimized lens system 610 is shown in FIG. 18. In the sixth optimized lens system 610, a first asphere 681, a first acromat 682, a system stop 683, a second acromat 684, 10 and a second asphere 685 are sequentially disposed corresponding to lenses 81, 82, 84, 85 and system stop 83 of the base architecture 10. Additionally, a third acromat 686 is disposed between first asphere 681 and first acromat 682 and a third asphere 687 is disposed between second acromat 684 and second asphere 685. Also the surfaces of the acromats 683, 684, 686 are not constrained to a spherical geometry, but are allowed to be optimized with an aspheric geometry. The surface data for the sixth optimized lens system 610 is optimized for the new constraints (i.e., added acromat).

Surface data for the lenses 681, 682, 684, 685, 486, 687 of an exemplary sixth optimized lens system are provided in table 13, with the asymmetric coefficients provided in table 14. These exemplary lens surfaces were developed by the inventors using ZEMAX™ software and novel characteristics determined by the inventors. The thickness values are the distance to the previous surface (i.e., the thickness for the back surface of a lens element is the thickness of that lens element, and the thickness for the front surface of a lens is the air gap in front of that lens). As indicated by the signs of the radii in table 13, the directions of curvature for the surfaces of the fourth optimized lens system 410 are the same as the corresponding surfaces for the base architecture.

While the added acromat 686 and added sphere 687 and aspheric surfaces on the acromats 682, 684, 686 enhance the performance of the sixth optimized lens system 610, cost is increased due to the material and processing cost associated with the added lenses and complex geometry. Thus, the sixth optimized lens system 610 provides a performance/cost trade-off with respect to the base architecture and other optimized lens systems. geometry. The surface data for the sixth optimized lens system 610 is optimized for the new constraints (i.e., added acromat).

Surface data for the lenses 681, 682, 684, 685, 486, 687 of an exemplary sixth optimized lens system are provided in table 13, with the asymmetric coefficients provided in table 14. These exemplary lens surfaces were developed by the inventors using ZEMAX™ software and novel characteristics determined by the inventors. The thickness values are the distance to the previous surface (i.e., the thickness for the back surface of a lens element is the thickness of that lens element, and the thickness for the front surface of a lens is the air gap in front of that lens). As indicated by the signs of the radii in table 13, the directions of curvature for the surfaces of the fourth optimized lens system 410 are the same as the corresponding surfaces for the base architecture.

While the added acromat 686 and added sphere 687 and aspheric surfaces on the acromats 682, 684, 686 enhance the performance of the sixth optimized lens system 610, cost is increased due to the material and processing cost associated with the added lenses and complex geometry. Thus, the sixth optimized lens system 610 provides a performance/cost trade-off with respect to the base architecture and other optimized lens systems.

TABLE 13

| Surface | Type | Radius | Thickness | Glass | Diameter | Conic |
|---|---|---|---|---|---|---|
| Object | Tiltsurf | — | 800 | | 1100.002 | — |
| 685b | Evenasph | 49.87182 | 32.75977 | SK4 | 76.07578 | −0.02849491 |
| 685a | Evenasph | 11.67315 | 17.28823 | | 30.17249 | −0.564595 |
| 687b | Evenasph | −40.31007 | 27.84111 | SF56A | 27.79537 | 3.353251 |
| 687a | Evenasph | −25.10491 | 27.80613 | Balf4 | 30.21244 | −1.443872 |
| 684c | Evenasph | −42.25773 | 4.810219 | | 28.91246 | −0.1407201 |
| 684b | Evenasph | 2355.193 | 4.978408 | Bafn 10 | 24.83306 | −31204.17 |
| 684a | Evanasph | −23004.79 | 22.87709 | | 23.34838 | −180916.1 |
| 683 | Standard | Infinity | 2.690734 | | 9.9 | 0 |
| 682c | Evenasph | −72.34824 | 1.044008 | SF1 5 | 11.44603 | 36.57998 |
| 682b | Evenasph | 16.70623 | 8.229727 | Bak 1 | 12.34496 | −3.589178 |
| 682a | Evenasph | −35.63195 | 1.226665 | | 15.48337 | 4.1348 |
| 686c | Evenasph | 37.90074 | 1.893348 | KZFSN2 | 16.88955 | −11.46645 |
| 686b | Evenasph | 104.6051 | 1.031464 | SK5 | 17.05181 | −482.2851 |
| 686a | Evenasph | 88.96748 | 15.5136 | | 17.26505 | −106.0739 |
| 681b | Evenasph | 25.37949 | 4.27419 | SSKN8 | 23.44068 | −0.02902742 |
| 681a | Evenasph | −125.0166 | 5 | | 23.27411 | −106.8518 |

TABLE 13-continued

| Surface | Type | Radius | Thickness | Glass | Diameter | Conic |
|---|---|---|---|---|---|---|
| PBS | Standard | Infinity | 22 | SF2 | 28 | 0 |
| PBS | Standard | Infinity | 3.811 | | 28 | 0 |
| IMA | Standard | Infinity | | | 14.2852 | 0 |

TABLE 14

| Coefficient on: | Surface 685b: Evenasph | Surface 685a: Evenasph | Surface 687b: Evenasph | Surface 687a: Evenasph | Surface 684c: Evenasph |
|---|---|---|---|---|---|
| $r^2$ | −0.00031915088 | −0.0019417785 | 0.00010110516 | 9.67702e−005 | −8.4635127e−006 |
| $r^4$ | −1.2508272e−007 | −3.1862992e−006 | 1.0803524e−007 | −6.4869382e−007 | −6.9999911e−008 |
| $r^6$ | 5.0178624e−011 | −7.2456201e−009 | 2.436738e−010 | 1.0532888e−009 | 2.1286803e−010 |
| $r^8$ | 2.3932501e−014 | −7.1751929e−011 | −3.652601e−012 | 4.932869e−012 | −1.873703e−012 |
| $r^{10}$ | 1.7004439e−018 | 2.6250229e−013 | −1.4870201e−014 | 5.2534478e−014 | −7.9776443e−015 |
| $r^{12}$ | 4.3939537e−021 | −2.5387742e−016 | −1.8066141e−016 | 3.9891434e−017 | −8.4404691e−017 |
| $r^{14}$ | 9.1471997e−024 | 5.0293592e−019 | 4.0259878e−020 | −5.2313982e−020 | −6.3421687e−019 |
| $r^{16}$ | 8.0596278e−027 | −1.4977939e−021 | −1.2192114e−022 | 3.7723499e−022 | 5.1995304e−022 |

| Coefficient on: | Surface 684b: Evenasph | Surface 684a: Evenasph | Surface 682c: Evenasph | Surface 682b: Evenasph | Surface 682a: Evenasph |
|---|---|---|---|---|---|
| $r^2$ | 6.9143051e−005 | −8.6685086e−005 | 6.2678369e−006 | −8.9469132e−005 | 7.2965802e−006 |
| $r^4$ | −5.876305e−008 | −2.2405419e−007 | −7.7071353e−007 | 4.0176046e−006 | −3.5222977e−007 |
| $r^6$ | 1.8117458e−009 | −2.7813291e−009 | 2.1425583e−009 | 7.8147839e−008 | −2.0967656e−008 |
| $r^8$ | −1.2807627e−012 | −8.5373119e−012 | 2.089153e−010 | 3.54669e−009 | −2.2824791e−010 |
| $r^{10}$ | −1.3992345e−013 | 1.7062768e−014 | 1.3878922e−011 | 1.0684318e−010 | −8.0603132e−013 |
| $r^{12}$ | −8.2318992e−016 | 5.2914049e−016 | 4.2932736e−013 | 1.9016302e−012 | 5.4326353e−015 |
| $r^{14}$ | −7.5665237e−018 | −9.4705217e−018 | 8.3869892e−015 | −1.7444341e−014 | −3.6956311e−016 |
| $r^{16}$ | −1.1519362e−020 | −1.9767094e−019 | −8.6467765e−016 | −2.6814459e−015 | −1.8250833e−017 |

| Coefficient on: | Surface 686c: Evenasph | Surface 686b: Evenasph | Surface 686a: Evenasph | Surface 681b: Evenasph | Surface 681a: Evenasph |
|---|---|---|---|---|---|
| $r^2$ | −8.3748084e−006 | 0.00048534982 | 4.4252302e−006 | −0.00021415125 | −0.0001583804 |
| $r^4$ | 2.8500309e−007 | 2.9789635e−006 | −3.3888479e−008 | 4.2706663e−007 | 1.357591e−006 |
| $r^6$ | 1.1861727e−008 | 3.6887118e−009 | −5.290479e−009 | −5.9029867e−009 | 1.2917107e−008 |
| $r^8$ | 1.0160175e−010 | −1.9526486e−009 | −2.194889e−011 | 3.5529916e−012 | −1.3824995e−011 |
| $r^{10}$ | 6.7976404e−013 | −4.2079675e−011 | 3.1146539e−013 | 2.8855109e−014 | −4.2297077e−013 |
| $r^{12}$ | 1.2292238e−014 | −6.4038601e−013 | 6.1559528e−015 | −9.3445599e−016 | −4.1352109e−015 |
| $r^{14}$ | 2.0811845e−016 | −5.4301539e−015 | 8.6245664e−017 | −2.0086384e−017 | −2.4456213e−017 |
| $r^{16}$ | 4.4764823e−018 | −3.3015284e−017 | 2.0785149e−018 | −2.5158437e−019 | −6.6044664e−020 |

Figure 19:
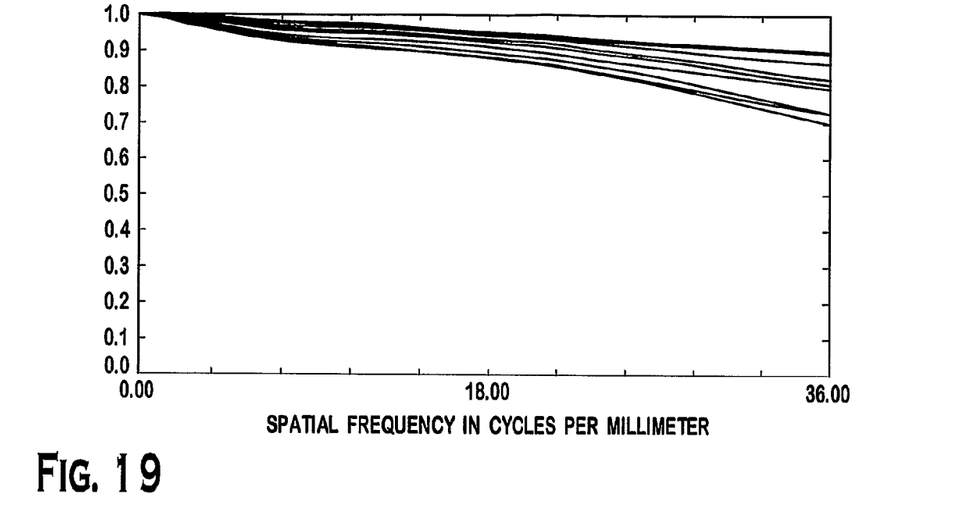
FIG. 19 shows a set of calculated curves for the optical transfer function for the exemplary projection lens system of FIG. 18.
Figure 20:
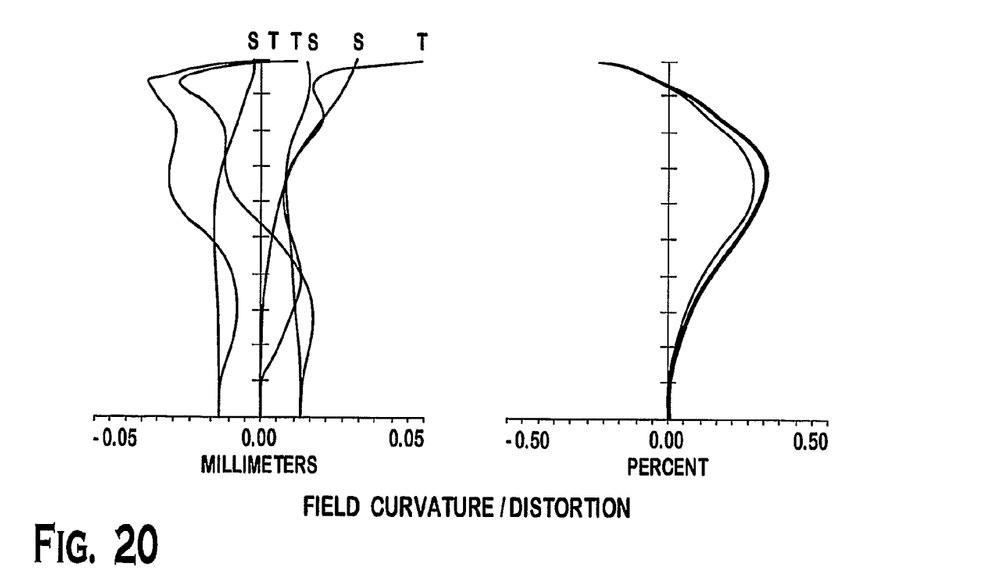
FIG. 20 shows a set of calculated curves for field curvature distortion for the exemplary projection lens system of FIG. 18.

FIGS. 19 and 20 show performance data for the sixth optimized lens system 610, as calculated using ZEMAX™ software. As shown in FIG. 19, the MTF for the sixth optimized lens system 610 is greater than about 0.65 at 36 cycles per millimeter. As shown in FIG. 20, the distortion due to field curvature is less than about 0.35% resulted in a grid distortion of less than about 0.30%.

The exemplary family of projection lens systems described above provides a plurality of lens systems, each having a double-gauss base architecture with aspheric lens elements at the beginning and end of the lens system with a system stop therebetween and an acromatic lens element pair between each aspheric lens and the system stop. Each lens system is optimized to provide a different cost/performance option. Thus, a member of the family of lens systems can be selected to achieve the required performance without incurring the cost of a lens system designed for greater performance and without custom designing a lens system for a particular application. Each exemplary lens system according to the present invention also provides good performance with fewer lens elements than existing projection lens systems, due to the durability of the double gauss base architecture.

The curvature direction of each element does not change throughout the family as the lens systems are optimized with additional elements and/or longer lens lengths. The lens systems provide from a 0.48 MTF (worst location) and 0.55% distortion (short 6 element) to a 0.69 MTF (worst location) and 0.30% distortion (9 element) with a variety of performance choices in between.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents. For example, the forgoing descriptions and accompanying Figs. show the behavior of the lenses in a single imager LCOS system with a 22 mm thick SF2 PBS between the LCOS imager and the first lens element. The family is adaptable to different dimension LCOS systems, and to DLP™ systems with a TIR prism instead of a PBS.

What is claimed is:

1. A projection lens family comprising a plurality of lens systems, each having a double-gauss base architecture with aspheric lens elements at the beginning and end of the lens system with a system stop therebetween and an acromatic lens element pair between each aspheric lens and the system stop, wherein at least one of the lens systems is optimized with one or more lens elements added to the base architecture between the aspheric lens elements at the beginning and end of the lens system.

2. A projection lens family according to claim 1 wherein the lenses vary in length within the projection lens family.

3. A projection lens family according to claim 2 wherein at least one of the lens systems is optimized for a system length of less than 1050 millimeters.

4. A projection lens family according to claim 1 wherein the lens systems are optimized to provide maximum distortions varying from about 0.55% to about 0.30% and a Modulus Transfer Functions varying from about 0.48 to about 0.69.

5. A projection lens family according to claim 4 wherein the lens systems use from 6 to 9 lens elements.

6. A projection lens family according to claim 1 wherein the acromatic lens element pairs for at least one lens system are formed from a combination of inexpensive glass materials chosen from the group consisting of: SF14, SF15, BAK1, and BALF4.

7. A projection lens system comprising a double-gauss architecture with aspheric lens elements at the beginning and end of the lens system with a system stop therebetween and an acromatic lens element pair between each aspheric lens and the system stop, wherein the acromatic lens element pairs for at least one lens system are formed from a combination of inexpensive glass materials chosen from the group consisting of: SF14, SF15, BAK1, and BALF4; and wherein the lens systems is configured to provide maximum distortion of less than about 0.55% and a Modulus Transfer Functions of at least about 0.48.

8. A projection lens system according to claim 7 wherein the lens system has at least six lens elements and no more than nine lens elements.

9. A projection lens system according to claim 7 further comprising an additional aspheric lens disposed between the aspheric lens at the beginning of the lens system and the acromatic lens between the aspheric lens at the beginning of the lens system and the system stop.

10. A projection lens system according to claim 7 further comprising an additional acromatic lens element pair disposed between the aspheric lens at the beginning of the lens system and the acromatic lens between the aspheric lens at the beginning of the lens system and the system stop.

11. A projection lens system according to claim 10 further comprising an additional aspheric lens disposed between the aspheric lens at the end of the lens system and the system stop and an additional acromatic tens disposed between the aspheric lens at the beginning of the lens system and the system stop.

12. A projection lens system according to claim 7 wherein the lens system is optimized for lenses that provide a system length of less than 1050 millimeters.

* * * * *